(12) United States Patent
Hsu et al.

(10) Patent No.: US 8,379,661 B2
(45) Date of Patent: Feb. 19, 2013

(54) METHODS AND SYSTEMS FOR A CUSTOMER PREMISE EQUIPMENT TO REVERSE THE UPSTREAM SPEED AND DOWNSTREAM SPEED OF A NETWORK CONNECTION

(75) Inventors: Roger Wencheng Hsu, Fremont, CA (US); Shoujung Jimmy Tsao, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 651 days.

(21) Appl. No.: 11/500,822

(22) Filed: Aug. 7, 2006

(65) Prior Publication Data

US 2008/0031276 A1 Feb. 7, 2008

(51) Int. Cl.
*H04L 12/413* (2006.01)
*H04L 12/40* (2006.01)

(52) U.S. Cl. ........................ 370/445; 370/437

(58) Field of Classification Search .......... 370/431–433, 370/437, 468
See application file for complete search history.

(56) References Cited

U.S. PATENT DOCUMENTS

| | | | | |
|---|---|---|---|---|
| 6,535,551 B1* | 3/2003 | Sweitzer et al. | ............... | 375/225 |
| 6,567,464 B2* | 5/2003 | Hamdi | ............... | 375/222 |
| 7,167,548 B1* | 1/2007 | Fedane | ............... | 379/93.06 |
| 7,315,538 B2* | 1/2008 | Wright et al. | ............... | 370/352 |
| 7,317,754 B1* | 1/2008 | Remy et al. | ............... | 375/222 |
| 2003/0118090 A1* | 6/2003 | Redfern | ............... | 375/222 |
| 2005/0157753 A1* | 7/2005 | Mayer | ............... | 370/468 |
| 2005/0213648 A1* | 9/2005 | Chow | ............... | 375/222 |
| 2007/0153835 A1 | 7/2007 | Khasnis | | |
| 2009/0154535 A1 | 6/2009 | Tsao et al. | | |
| 2009/0323788 A1* | 12/2009 | Gross et al. | ............... | 375/222 |

OTHER PUBLICATIONS

ITU-T Study Group 15, International Telecommunication Union, Series G: Transmission System and Media, Digital Systems and Networks, Digital transmission systems—Digital sections and digital line system—Access networks, Asymmetric digital subscriber line (ADSL) transceiver, ITU-T Recommendation G.992.1, (1997-2000), pp. 256.
ITU-T Study Group 15, International Telecommunication Union, Series G: Transmission System and Media, Digital Systems and Networks, Digital sections and digital line system—Access networks, Veryhigh speed digital subscriber line transceivers, ITU-T Recommendation G.993.1, (2001-2004), pp. 228.
PCT Notification of Transmittal of the International Search Report and Written Opinion of the International Searching Authority, International Application No. PCT/US2008/086763; Date of Mailing Apr. 2, 2009.
Stolowitz Ford Cowger LLP, Listing of related cases, Nov. 12, 2010.

\* cited by examiner

*Primary Examiner* — Mark Rinehart
*Assistant Examiner* — Angel Brockman
(74) *Attorney, Agent, or Firm* — Brinks Hofer Gilson & Lione (57) ABSTRACT

Methods and systems for customer premise equipment (CPE) to reverse the upstream speed and downstream speed of a network connection (e.g., ADSL connection) are described. The CPE is communicating with a network device via the network connection. Originally, the CPE's downstream speed with the network device significantly exceeds the CPE's upstream speed with the network device. A speed reversal signal is forwarded from the CPE to the network device. The signal requests the network device to reverse the CPE's downstream speed and upstream speed with the network device. The network device retrains the CPE. The CPE communicates with the retrained network device with an upstream speed that significantly exceeds the downstream speed.

25 Claims, 7 Drawing Sheets

Figure 1

Prior Art

METHODS AND SYSTEMS FOR A CUSTOMER PREMISE EQUIPMENT TO REVERSE THE UPSTREAM SPEED AND DOWNSTREAM SPEED OF A NETWORK CONNECTION

TECHNICAL FIELD

Embodiments relate to the field of Asymmetrical Digital Subscriber Line (ADSL). More particularly, embodiments of the present invention relate generally to reversible ADSL modes.

BACKGROUND

Asymmetric Digital Subscriber Line (ADSL) is a form of DSL, a data communications technology that enables faster data transmission over telephone lines than a conventional modem can provide.

The distinguishing characteristic of ADSL over DSL is that the volume of data flow is greater in one direction than the other. For example, ADSL may allow a user to download at high speeds (e.g., 8 Mbps) information from the Internet. However, the upload speed on the same ADSL may be significantly lower (e.g., 800 kbps). Further, under traditional approaches, the asymmetric data flow direction is fixed, meaning that a user with an ADSL has access to a relatively faster download speed a relatively slower upload speed.

Figure 1:
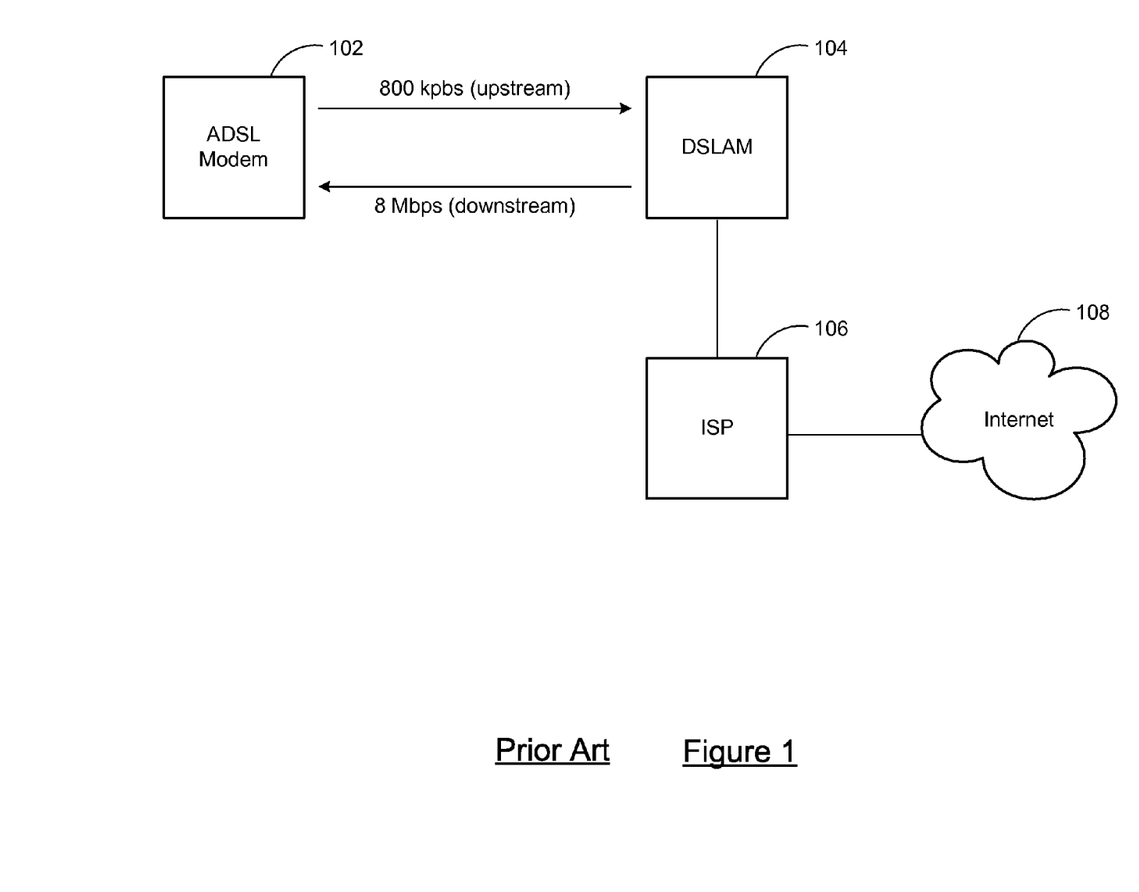
FIG. 1 (Prior Art) illustrates block diagrams of a conventional ADSL system.

Some ADSL users are more focused on downloading information from the Internet (e.g., web browsing, downloading photos, and/or downloading music) than uploading information to the Internet. As a result, ADSL connections are designed to have a fixed download speed that is significantly faster than its fixed slower upload speed. For example, FIG. 1 (Prior Art) illustrates block diagrams of a conventional ADSL system. FIG. 1 includes an ADSL modem 102, a Digital Subscriber Line Access Multiplexer (DSLAM) 104, an Internet Service Provider (ISP) 106, and Internet 108. The ADSL modem is communicatively coupled with DSLAM 104. The upload speed and download speed for the ADSL modem 102 with respect to the DSLAM is fixed based on bandwidth allocation. In one embodiment, ADSL modem has a fixed download speed (e.g., 8 Mbps) that is significantly faster than its upload speed (e.g., 800 kpbs).

However, although during most times ADSL users may desire a faster download speed over a faster upload speed, in certain instances ADSL users may wish to reverse this asymmetry and have a faster upload speed instead. In particular, in certain situations a user and/or an enterprise may wish to upload significant amounts of data efficiently. In one example, an enterprise may wish to back up important data files onto an online storage service. In another example, an individual user may wish to upload large numbers of photos and/or video clips to share with friends and family.

DETAILED DESCRIPTION OF THE DRAWINGS

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which can be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter can be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

Traditionally, Asymmetric Digital Subscriber Line (ADSL) connections provide a user with a downstream rate that is significantly higher than its corresponding upstream rate. The majority of the ADSL bandwidth is dedicated to downstream traffic because in certain instances users utilize their ADSL connection primarily for downloading information from the Internet rather than uploading information to the Internet. For example, when a user engages in web browsing, the majority of the network traffic is downstream traffic.

However, in other instances, users and enterprises can benefit greatly from having an upstream rate that is significantly higher than its corresponding downstream rate. By dedicating the majority of the available bandwidth to upstream rate instead of downstream rate, an enterprise can, for example, more efficiently run a daily backup operation that requires uploading large amounts of data to a remote backup center. As for the individual user, he or she may desire to upload photos, music, and/or videos to share with friends and family. Thus, for ADSL users, a high upstream rate can be equally desirable as a high downstream rate.

Because for some users, a high upstream can be as useful as a high downstream rate, a traditional ADSL connection that is only capable of providing a fixed high downstream rate may not be an optimal solution. As a better solution, embodiments set forth methods and systems for implementing a reversible ADSL connection. Embodiments allow an ADSL user the ability to switch from dedicating the majority of the available bandwidth to downstream to dedicating the majority of the available bandwidth to upstream. Thus, as a user's task at the moment changes, he or she may simply, in one example, make a selection to switch from one mode (e.g., faster downstream) to another mode (e.g., faster upstream). Further, in one example, the mode switching can be performed at a speed that is practically instantaneous. In this example, the user is virtually provided with a high upstream speed and a high downstream speed. In another example, the mode switching occurs automatically without needing a user's intervention. Specifically, in one embodiment, an associated application program (e.g., a detection program) detects the user's activities and intelligently switches from one mode (e.g., faster upload) to another mode (e.g., faster download) to maximize efficiency of an ADSL connection.

For example, a user may initially be using the ADSL connection for web browsing that involves mostly downstream traffic and very little upstream traffic. A detection application program detects that the user is utilizing the ADSL connection for web browsing and maintains the ADSL connection at a first mode (e.g., faster downloading) to maximize efficiency. At a later point in time, when the user decides to upload large amounts of data (e.g., videos) to a website to share with friends, the detection application program intelligently and automatically switches to a second mode (e.g., faster uploading) to enhance performance of the ADSL.

In overview, embodiments generally relate to methods and systems for customer premise equipment (CPE) to reverse the upstream speed and downstream speed of a network connection (e.g., ADSL connection). In one embodiment, the CPE is communicating with a network device (e.g., a DSLAM) via the network connection. Originally, the CPE's downstream speed with the network device significantly exceeds the CPE's upstream speed with the network device. A speed reversal signal is forwarded from the CPE to the network device. The signal requests the network device to reverse the CPE's downstream speed and upstream speed with the network device. The network device conducts retraining. Upon completion of retraining, the CPE communicates with the network device with an upstream speed that significantly exceeds the downstream speed. Advantageously, embodiments enable a network connection (e.g., ADSL connection) to be utilized much more efficiently.

Figure 2A:
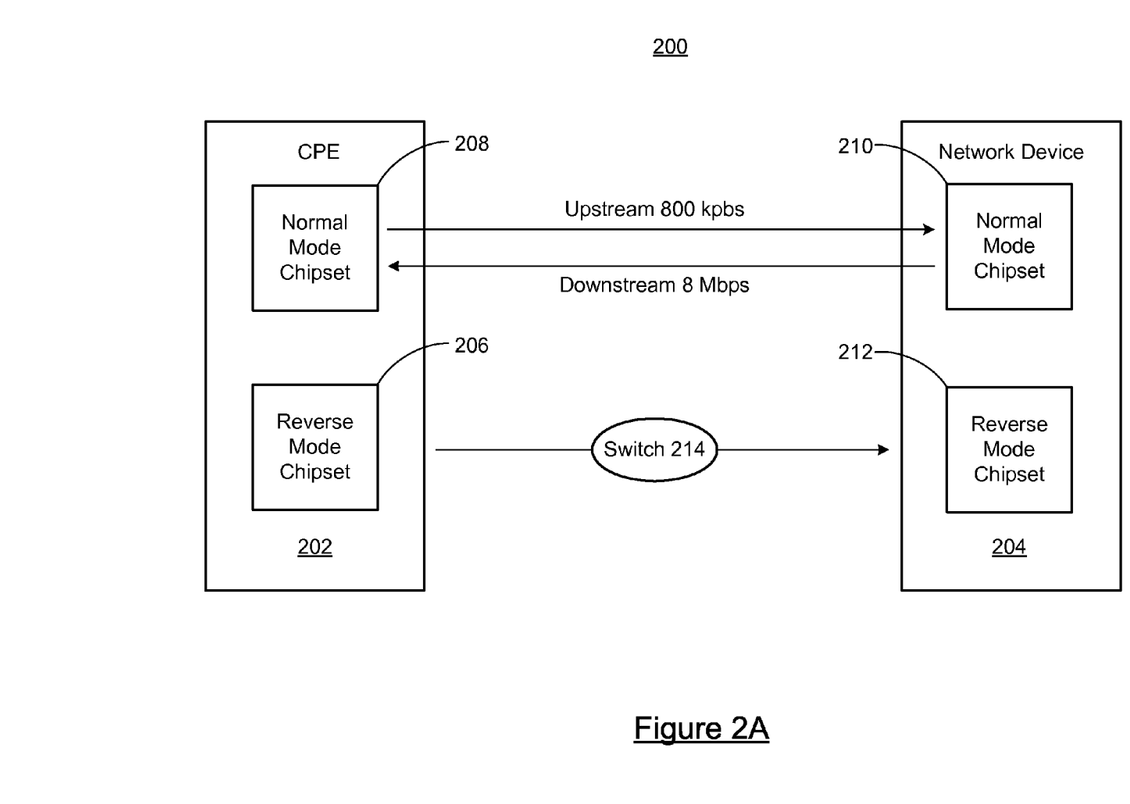
FIGS. 2A and 2B illustrate block diagrams of a reversible network connection system in operation, upon which embodiments may be implemented.
Figure 2B:
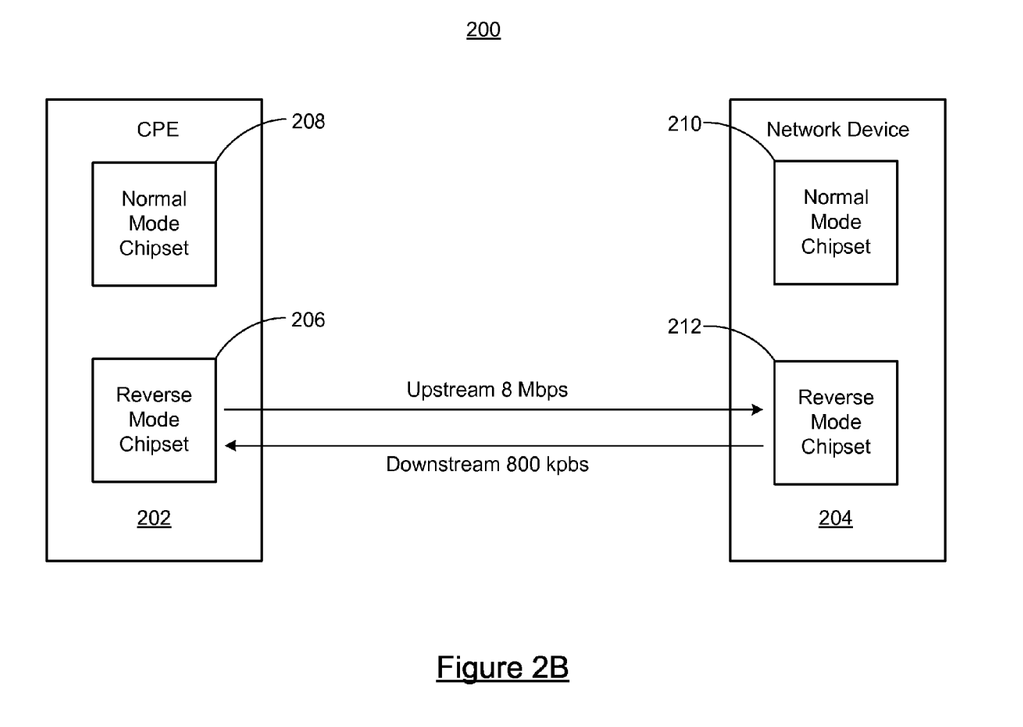

FIGS. 2A and 2B illustrate block diagrams of a reversible network connection system 200 in operation, upon which embodiments may be implemented. System 200 includes Customer Premise Equipment (CPE) 202, network device 204 (e.g., a DSLAM), normal mode chipset 208, reverse mode chipset 206, normal mode chipset 210, and reverse mode chipset 212. The network connection can be an Asymmetric Digital Subscriber Line (ADSL) connection, a Very High Bit-rate DSL (VDSL) connection, and/or other types of compatible connection. Also, in one embodiment, the network device is a Digital Subscriber Line (DSL) modem.

Although reversible network connection system 200 is shown and described as having certain numbers and types of elements, the embodiments are not necessarily limited to the exemplary implementation. That is, reversible network connection system 200 can include elements other than those shown, and can include more than one of the elements that are shown.

With reference to FIG. 2A, CPE 202 is communicatively coupled with network device 204. In particular, CPE 202's normal mode chipset 208 is communicating with its counterpart, network device 204's normal mode chipset 210. Initially, at the CPE side, network traffic is being sent and received by normal mode chipset 208. Correspondingly, at the network device side, network traffic is being sent and received by normal mode chipset 210. Normal mode chipset 208 is configured to process network traffic where the downstream rate is much higher than the upstream rate. In one example, the downstream rate is 8 Mbps and the upstream rate is 800 kpbs. Also, network device 204's normal mode chipset 210 is configured to properly complement the CPE 202's normal mode chipset 208.

At a certain point later in time, a user may, for example, desire to switch the bandwidth assigned to the upstream traffic and downstream traffic such that the CPE 202's upstream rate is much higher than its downstream rate. In one example, this switch may be because the user desires to perform a backup operation that requires uploading appreciable amounts of data. To initiate a mode switch, a switch mode signal 214 is sent from CPE 202 to network device 204.

After the switch mode signal 214 is correctly processed, network device 204 switches to utilize the reverse mode chipset 212 for network communications. In one example, the network device 204 retrains the CPE 202 and assigns the majority of the available network bandwidth (e.g., ADSL bandwidth) to upstream traffic (e.g., 8 Mbps) and the remaining minority of the available network bandwidth to downstream traffic (e.g., 800 kpbs).

FIG. 2B shows that CPE 202, after the switch, is now communicating with network device 204 via reverse mode chipset 206. Similarly, network device 204 uses reverse mode chipset 212 to communicate with CPE 202. Reverse mode chipset 206 for the CPE 202 is configured to process network traffic where the upstream rate far exceeds the downstream rate. Complementarily, reverse mode chipset 212 for the network device 204 is configured to properly function with reverse mode chipset 206.

Thus, by switching from a normal mode to a reverse mode, embodiments allow a user to more efficiently utilize the network connection, such as an ADSL connection. In one example, the switch can be made almost instantaneously, which allows a user the ability to easily switch back and forth as his or her needs change. Further, in one embodiment, the network device 204 (e.g., a DSLAM) can train the line with the CPE 202 directly in the reverse mode as long as the network device 204 and CPE 202 agree. Also, subsequently, CPE 202 and network device 204 can switch back to the normal mode. Moreover, in one embodiment, the network device 204 (e.g., a DSLAM) is capable of initiating a mode reversal retraining without receiving a request from CPE 202. In one example, the network device 204 may initiate a mode reversal retraining at a preset time.

Figure 3A:
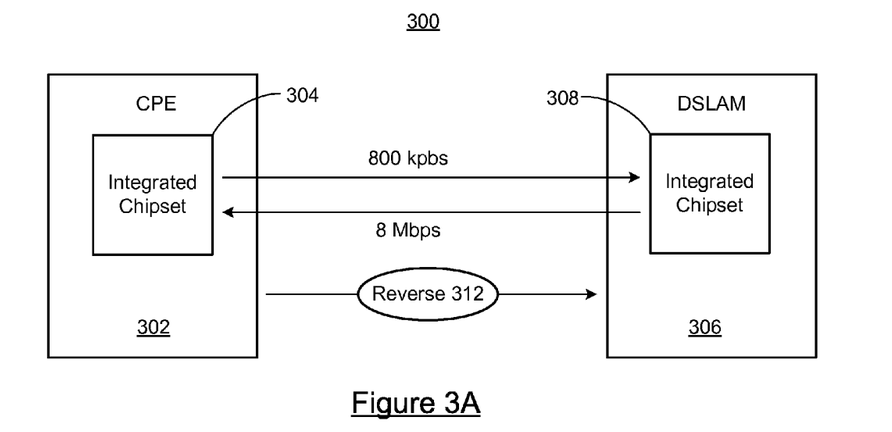
FIGS. 3A and 3B illustrate block diagrams of a reversible network connection system that utilizes an integrated chipset in operation, upon which embodiments may be implemented.
Figure 3B:
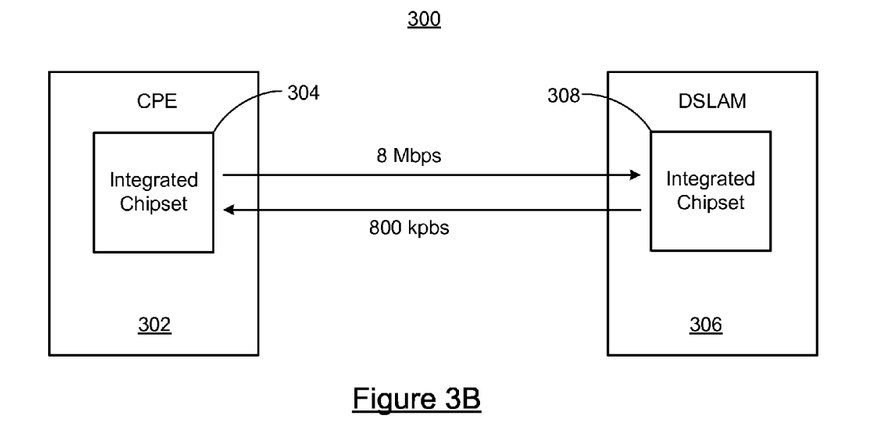

FIGS. 3A and 3B illustrate block diagrams of a reversible network connection system 300 that utilizes an integrated chipset in operation, upon which embodiments may be implemented. System 300 includes Customer Premise Equipment (CPE) 302, DSLAM 306, integrated chipset 304, and integrated chipset 308.

System 300 bears similarities to System 200 shown in FIG. 2A and FIG. 2B. The main difference between system 300 and system 200 is that instead of having a normal mode chipset and a reverse mode chipset, system 300 has integrated chipsets 304 and 308.

In summary, integrated chipset 304 is capable of performing the functions of normal mode chipset 208 and reverse mode chipset 206 of FIG. 2. In the same way, integrated chipset 308 is capable of performing the functions of normal mode chipset 210 and reverse mode chipset 212 of FIG. 2.

In FIG. 3A, CPE 302 is communicating with DSLAM 306. In particular, integrated chipset 304 communicates with integrated chipset 308. In FIG. 3A, the majority of the bandwidth (8 Mbps) is dedicated to downstream traffic to the CPE 302. The remaining minority of the bandwidth (800 kpbs) is dedicated to upstream traffic from CPE 302.

At a subsequent point in time, a reverse signal 312 is sent from the CPE 302 to DSLAM 306, requesting DSLAM to execute a bandwidth dedication reversal. DSLAM complies and retrains CPE 302. As a result, in FIG. 3B, the majority of the available bandwidth is now dedicated to upstream traffic from CPE 302 and the remaining minority of the available bandwidth is now dedicated to downstream traffic to CPE 302.

Embodiments show that the present claimed subject matter can be implemented on integrated chipsets as well as separate chipsets so long as the functionality of being able to switch from one mode (e.g., fast download and slow upload) to another mode (e.g., fast upload and slow download) is available.

Figure 4:
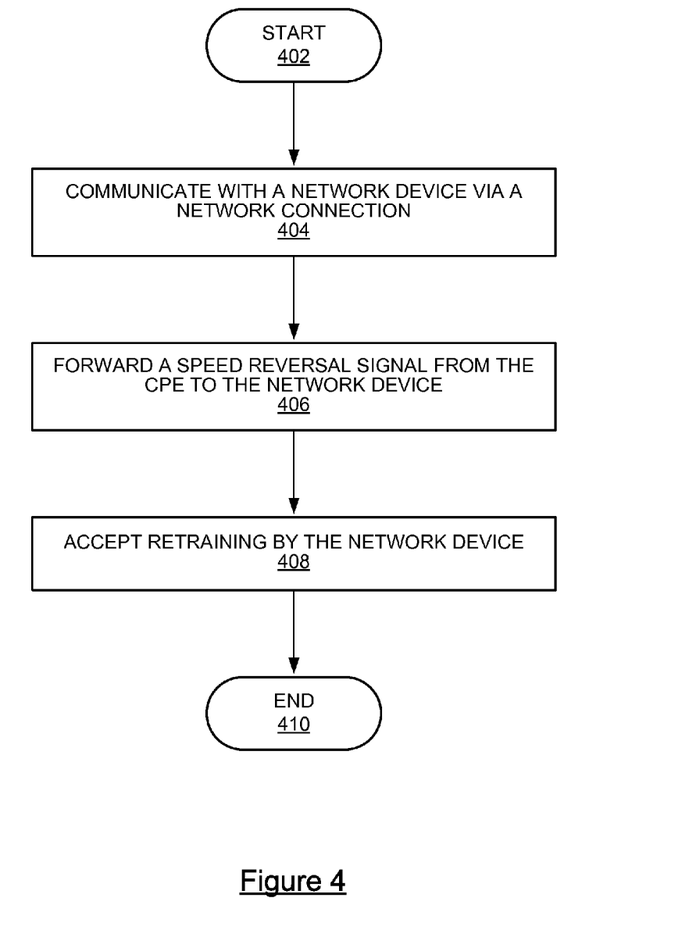
FIG. 4 illustrates a flowchart of a method for a customer premise equipment (CPE) to reverse the upstream speed and downstream speed of a network connection, upon which embodiments in accordance with the present claimed subject matter can be implemented.

FIG. 4 illustrates a flowchart 400 of a method for a customer premise equipment (CPE) to reverse the upstream speed and downstream speed of a network connection, upon which embodiments in accordance with the present claimed subject matter can be implemented. Although specific steps are disclosed in flowchart 400, such steps are exemplary. That is, embodiments of the present claimed subject matter are well suited to performing various other or additional steps or variations of the steps recited in flowchart 400. It is appreciated that the steps in flowchart 400 can be performed in an order different than presented.

At block 402, the process starts.

At block 404, the CPE communicates with a network device via a network connection (e.g., an ADSL connection). The CPE's downstream speed with the network device significantly exceeds the CPE's upstream speed with the network device. In one embodiment, the CPE is a Digital Subscriber Line (DSL) modem. In one embodiment, the network device is a Digital Subscriber Line Access Multiplexer (DSLAM).

At block 406, a speed reversal signal is forwarded from the CPE to the network device. The signal requests the network device to reverse the CPE's downstream speed and upstream speed with the network device.

In one embodiment, the network device includes a first chipset and a second chipset. The first chipset is configured to function with a CPE where the CPE downstream speed significantly exceeds the CPE upstream speed and the second chipset is configured to function with a CPE where the CPE upstream speed significantly exceeds the CPE downstream speed. In response to a speed reversal signal, the network device can direct communications processing from the first chipset to the second chipset.

At block 408, retraining from the network device is accepted. The CPE communicates with the retrained network device with an upstream speed that significantly exceeds the downstream speed. In one embodiment, the CPE comprises an integrated chipset capable of handling network traffic where the upstream speed significantly exceeds the downstream speed and network traffic where the downstream speed significantly exceeds the upstream speed. In one embodiment, the speed reversal signal is sent via an Embedded Operations Channel (EOC).

At block 410, the process ends.

Figure 5:
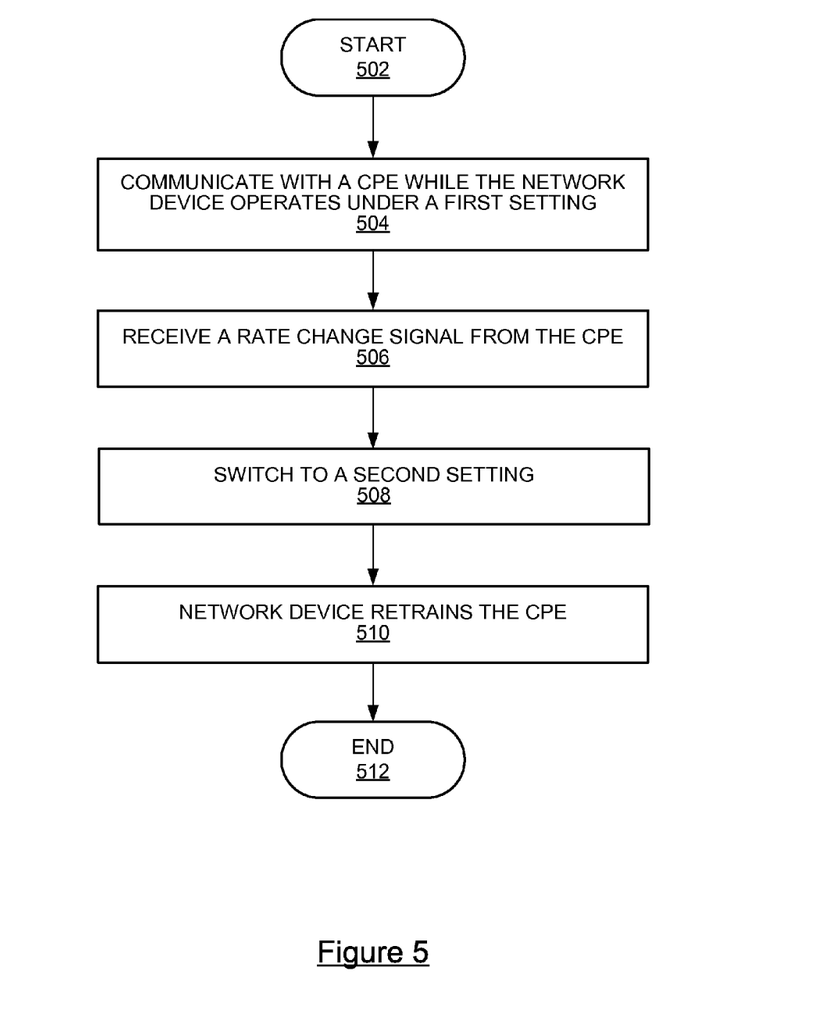
FIG. 5 illustrates a flowchart of a method for a network device to change the upstream rate and downstream rate of a network connection, upon which embodiments in accordance with the present claimed subject matter can be implemented.

FIG. 5 illustrates a flowchart 500 of a method for a network device to change the upstream rate and downstream rate of a network connection, upon which embodiments in accordance with the present claimed subject matter can be implemented. Although specific steps are disclosed in flowchart 500, such steps are exemplary. That is, embodiments of the present claimed subject matter are well suited to performing various other or additional steps or variations of the steps recited in flowchart 500. It is appreciated that the steps in flowchart 500 can be performed in an order different than presented.

At block 502, the process starts.

At block 504, the network device communicates with a CPE while the network device operates under a first setting. The CPE's downstream rate is higher than the CPE's upstream rate. In one embodiment, the network connection is an Asymmetric Digital Subscriber Line (ADSL) connection.

At block 506, a rate change signal is received from the CPE. In one embodiment, the network device comprises an integrated chipset that is capable of processing network traffic under a first mode where the CPE downstream rate is higher than the CPE upstream rate. Also, the network device is capable of processing network traffic under a second mode where the CPE upstream rate is higher than the CPE downstream rate, and wherein the rate change signal causes the integrated chipset to switch from the first mode to the second mode.

At block 508, the network device switches to a second setting. The second setting allows the CPE's upstream rate to be higher than the CPE's downstream rate.

At block 510, the network device retrains the CPE. The retrained network device provides the CPE with an upstream rate that is higher than its downstream rate. In one embodiment, the switching is implemented effectively simultaneously. In one embodiment, the retraining is implemented almost instantaneously.

At block 512, the process ends.

Figure 6:
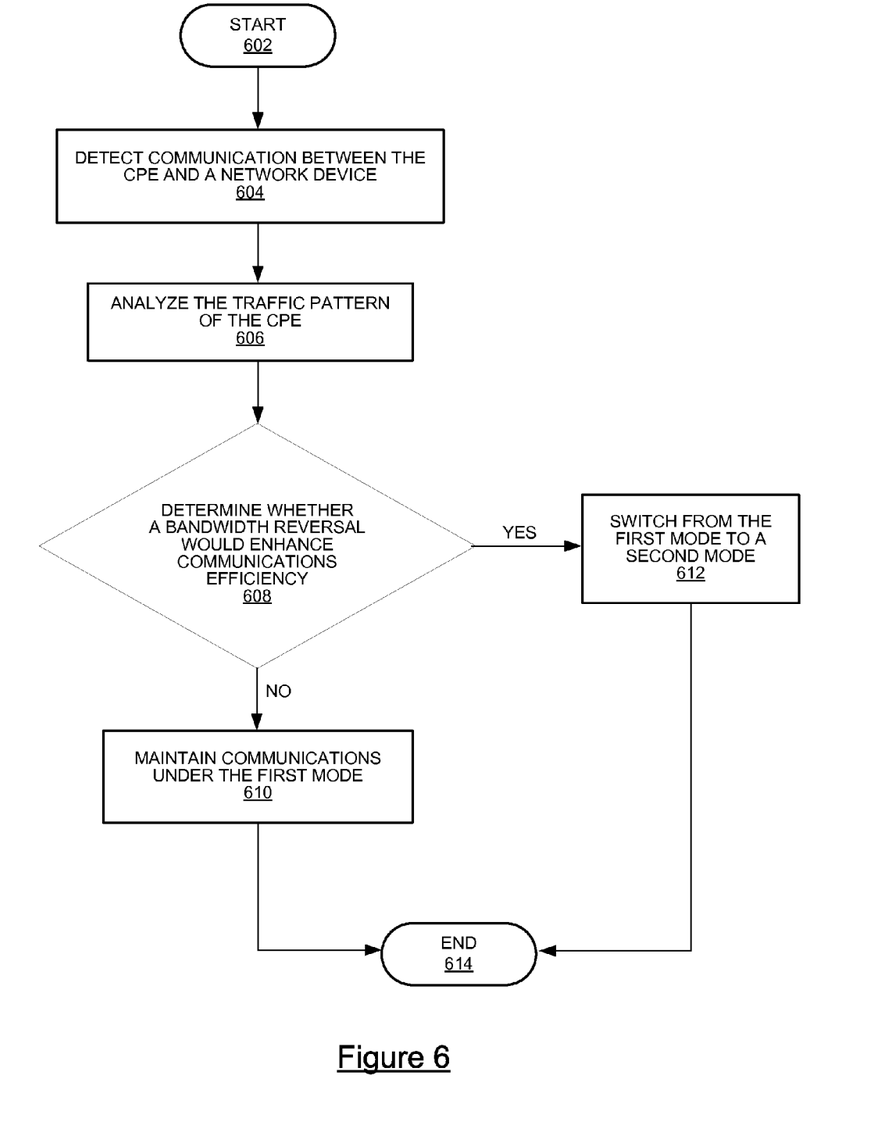
FIG. 6 illustrates a flowchart for a CPE to automatically reverse the upstream bandwidth and downstream bandwidth of a network connection, upon which embodiments in accordance with the present claimed subject matter can be implemented.

FIG. 6 illustrates a flowchart 600 for a CPE to automatically reverse the upstream bandwidth and downstream bandwidth of a network connection, upon which embodiments in accordance with the present claimed subject matter can be implemented. Although specific steps are disclosed in flowchart 600, such steps are exemplary. That is, embodiments of the present claimed subject matter are well suited to performing various other or additional steps or variations of the steps recited in flowchart 600. It is appreciated that the steps in flowchart 600 can be performed in an order different than presented.

At block 602, the process starts.

At block 604, the communication between the CPE and a network device is detected. The CPE and the network device are communicating under a first mode. Under the first mode the CPE is provided more downstream bandwidth than upstream bandwidth. In one embodiment, the network connection is a Very High Bit-rate DSL (VDSL) connection.

At block 606, the network traffic pattern of the CPE is analyzed. In one embodiment, the analyzing is implemented automatically by an intelligent application program. In one embodiment, a user can pre-specify certain activities as ones that would especially benefit from a high downstream rate or a high upstream rate.

At block 608, it is determined whether a bandwidth reversal would enhance communications efficiency. The determination may be based at least in part on a list of factors inputted by a user.

At block 610, it is determined that a bandwidth reversal would not enhance communications efficiency and communications under the first mode is maintained.

At block 612, it is determined that a bandwidth reversal would enhance communications efficiency and a switch is made from the first mode to a second mode.

At block 614, the process ends.

In the foregoing specification, embodiments of the claimed subject matter have been described with reference to numerous specific details that can vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
communicating, by a customer premise equipment (CPE) with Digital Subscriber Line Access Multiplexer (DSLAM) via a digital subscriber line (DSL) associated with an available bandwidth, the digital subscriber line being a single line where allocation of the available bandwidth is reversible between a normal mode, wherein a downstream speed exceeds an upstream speed over said digital subscriber line, and a reverse mode wherein said upstream speed exceeds said downstream speed over said digital subscriber line;
identifying a triggering event indicating a demand for additional upstream speed based on an analysis of the current traffic pattern;
responsive to identifying the triggering event, sending a speed reversal message configured to initiate a switch from normal mode of communication over the digital subscriber line to reverse mode of communication over the digital subscriber line; and
switching to reverse mode responsive to said speed reversal message wherein switching increases said upstream speed and decreases said downstream speed to re-allocate said available bandwidth oppositely in said digital subscriber line without increasing said available bandwidth.

2. The method of claim 1, wherein said speed reversal signal is sent via an Embedded Operations Channel (EOC).

3. The method of claim 1, further comprising:
automatically detecting communication between a modem and the Digital Subscriber Line Access Multiplexer (DSLAM).

4. The method of claim 1, wherein said digital subscriber line comprises a Very High Bit-rate DSL (VDSL) connection.

5. The method of claim 1, wherein the digital subscriber line is an asymmetric digital subscriber line (ADSL).

6. The method of claim 1, wherein the CPE is a digital subscriber line modem.

7. The method of claim 1, wherein said speed reversal message instructs the Digital Subscribe Line Access Multiplexer (DSLAM) to initiate a retraining session with the CPE using Digital Subscriber Line Access Multiplexer (DSLAM) retraining, and switching to reverse mode comprises receiving mode reversal retraining instructions.

8. The method of claim 1, wherein switching to the reverse mode comprises swapping communications processing from a first chipset to a second chipset responsive to said switching from the normal mode to the reverse mode, wherein the first chipset is configured to communicate over the digital subscriber line with a first counterpart chipset in the Digital Subscriber Line Access Multiplexer (DSLAM), and the second chipset is configured to communicate over the digital subscriber line with a second counterpart chipset in the Digital Subscriber Line Access Multiplexer (DSLAM).

9. A method, comprising:
communicating, using a Digital Subscriber Line Access Multiplexer (DSLAM), with a customer premise equipment (CPE) in a normal communications mode via a digital subscriber line associated with an available bandwidth divided between a downstream traffic rate and an upstream traffic rate, wherein said digital subscriber line is a single line and a majority of said available bandwidth is dedicated to a first downstream rate during a first operating mode, and wherein said first downstream rate is higher than a first upstream rate;
receiving a rate change signal from said CPE, wherein the rate change signal indicates a demand for a bandwidth reversal of the digital subscriber line; and
switching to a reverse communications mode comprising communicating on the digital subscriber line in reverse mode in which the available bandwidth of the digital subscriber line is re-allocated oppositely to be dedicated to a second upstream rate that is higher than a second downstream rate;
wherein the reverse mode uses the same available bandwidth as the normal mode.

10. The method of claim 9, wherein said digital subscriber line comprises an Asymmetric Digital Subscriber Line (ADSL) connection.

11. The method of claim 9 wherein switching to a reverse mode comprises switching communications processing from a first chipset to a second chipset;
wherein said first chipset is configured to communicate with a first counterpart chipset in the CPE and process network traffic when operating in said normal mode, wherein said second chipset is configured to communicate with a second counterpart chipset in the CPE and process said network traffic when said network device is operating in said reverse mode.

12. The method of claim 11 wherein the first chipset is physically separate from said second chipset.

13. The method of claim 11 wherein the first chipset is physically integrated with said second chipset.

14. The method of claim 9, further comprising responsive to the rate change signal, initiating a retraining session with the CPE to reassign the available bandwidth over the network connection for operation in the reverse communications mode, wherein the retraining session includes instructions for retraining the DSLAM.

15. The method of claim 14, wherein the rate change signal instructs the Digital Subscriber Line Access Multiplexer (DSLAM) to conduct a retraining session.

16. The method of claim 9, wherein the digital subscriber line is a very high bit-rate digital subscriber line (VDSL).

17. The method of claim 9, wherein said switching is implemented substantially simultaneously with receipt of the rate change signal.

18. The method of claim 9, wherein said retraining is implemented substantially instantaneously with switching to the reverse communications mode.

19. The method of claim 9, further comprising detecting an application of said CPE, wherein said rate change signal is associated with said detected application.

20. An apparatus, comprising:
a chipset configured to communicate with a corresponding counterpart chipset in a Digital Subscriber Line Access Multiplexer (DSLAM) over a digital subscriber line associated with an available bandwidth, wherein said digital subscriber line is a single line, and said chipset is configured to assign a majority of the available bandwidth of said digital subscriber line to a downstream speed and assign a minority of the available bandwidth of said digital subscriber line to an upstream speed in a normal mode of operation, so that the downstream speed exceeds the upstream speed;
said chipset further configured to communicate with said corresponding counterpart chipset in said DSLAM over said digital subscriber line in a reverse mode of operation, said chipset, responsive to a speed reversal signal, is configured to reverse assignment of the available bandwidth of the digital subscriber line to assign the majority of the available bandwidth of the digital subscriber line to the upstream speed and assign the minority of the digital subscriber line to the downstream speed, wherein the chipset is configured to communicate with said DSLAM over the digital subscriber line in the reverse mode of operation using a same available bandwidth as in the normal mode of operation.

21. The method of claim 20, wherein the speed reversal signal is a retraining operation initiated by the DSLAM that includes DSLAM retraining instructions.

22. The apparatus of claim 20, wherein the chipset comprises a first chipset and a second chipset, and the corresponding counterpart chipset comprises a first corresponding counterpart chipset and a second corresponding counterpart chipset, the first chipset and corresponding first counterpart chipset configured to operate in the normal mode of operation, and the second chipset and second corresponding chipset configured to operate in the reverse mode of operation, the first chipset being physically separate from the second chipset.

23. An apparatus, comprising:
a chipset configured to communicate with a corresponding counterpart chipset in a customer premise equipment (CPE) over a digital subscriber line having an available bandwidth, the digital subscriber line being a single line and the chipset configured to allocate the available bandwidth of the digital subscriber line so that a downstream speed over the digital subscriber line is higher than an upstream speed over the digital subscriber line in a first mode of operation; and
the chipset further configured to communicate with the corresponding counterpart chipset in said CPE over said digital subscriber line in a second mode of operation, responsive to receipt of a signal from the CPE to switch an operating mode from the first mode of operation to a second mode of operation in the second mode of operation the chipset configured to re-allocate the available bandwidth of the digital subscriber line oppositely so that the upstream speed over the digital subscriber line is higher than the downstream speed over the digital subscriber line, wherein the available bandwidth of the digital subscriber line remains unchanged in the first mode and the second mode.

24. The apparatus of claim 23, wherein the chipset is further configured to initiate a mode reversal retraining of the chipset, and the counterpart chipset in the CPE using retraining instructions included in the signal from the CPE.

25. The apparatus of claim 23, wherein the chipset comprises a first chipset and a second chipset, and the corresponding counterpart chipset comprises a first corresponding counterpart chipset and a second corresponding counterpart chipset, the first chipset and corresponding first counterpart chipset configured to operate in the first mode of operation, and the second chipset and second corresponding chipset configured to operate in the second mode of operation, the first chipset being physically separate from the second chipset.

* * * * *